3,732,331
PROCESS FOR THE PRODUCTION OF PLASTICS AND LACQUER RESINS FROM BASIC NITROGEN-CONTAINING GLYCIDYL COMPOUNDS AND DICARBOXYLIC ANHYDRIDES
Johannes Wollner, Moers-Kapellen, Martin Cherubim, Rheinkamp-Eick, and Friedrich Henn, Homberg-Niederrhein, Germany, assignors to Deutsche Texaco Aktiengesellschaft, New York, N.Y.
No Drawing. Filed Aug. 10, 1970, Ser. No. 62,692
Int. Cl. C08g 45/06
U.S. Cl. 260—830 TW      12 Claims

ABSTRACT OF THE DISCLOSURE

This invention concerns a process for increasing the hardening rates in the preparation of epoxide resins using dicarboxylic anhydrides as hardening agents. The increase in hardening rates is achieved by reacting mixtures of basic nitrogen-containing glycidyl compounds with dicarboxylic anhydrides. An optional aspect of the inventive process is to conduct the above reaction in the presence of alkyd resins and/or solvents.

---

This invention concerns novel hardening compositions, their use in hardening epoxides and the uncured and cured resins produced therein.

More particularly, this invention relates to mixtures of dicarboxylic anhydrides and basic nitrogen-containing glycidyl compounds which are used to harden epoxides compositions as well as epoxides in the presence of alkyd resins and/or solvents.

BACKGROUND OF THE INVENTION

Epoxy resins are resinous materials containing epoxy groups. These resins are widely used in protective coatings and films, as structural plastics, and as adhesives among other applications.

Epoxy resins are thermosetting materials which may be converted into durable, crosslinked polymers by the utilization of hardening or "curing" agents with or without the application of heat. Simple heating of epoxy containing materials does not cure the resins effectively. In the plastics industry the epoxy-containing resins are normally blended with a specific "hardener" by the user to obtain the desired physical properties.

Desirably, hardening agents utilized for epoxide resins should combine certain characteristics for widespread commercial acceptance. The most important of these are: being in the form of low viscosity liquids, having high reactivity at elevated temperatures yet having relatively good "pot life" stability at storage temperatures of about 20° C.

Hardeners in the liquid state at room temperature offer the advantage that they can frequently be used without the need for solvents, and without the need to heat the polymer mixtures to insure uniformity. Heating increases the risk of premature curing. Low viscosity is an especially desirable attribute for coating applications in that it permits deeper penetration of the substrate treated, increases wetting properties and allows the incorporation of large quantities of inexpensive fillers into the formulation. Rapid and high activity of the hardeners at elevated temperatures permits rapid processing cycles, while good "pot-life" stability at 20 to 30° C. permits safe long-term purchasing and storage of the epoxy resin in curable form.

A very large number of chemical compounds have been used as hardeners or curing agents to convert epoxy resins into useful hard, infusible, cross-linked polymers. These include polysulfides, amines, multi-functional alcohols, carboxylic acids, phenols and dicarboxylic anhydrides (anhydrides of dibasic acids) among others. While all of the above may be used, the most commonly employed hardeners are the dicarboxylic anhydrides such as phthalic anhydride, dodecylsuccinic anhydride, pyromellitic dianhydride, their isomers and their derivatives, among others.

While dicarboxylic anhydrides contribute to lowering the viscosity of the epoxide resin mixtures and produce hardened polymers having good final properties, they have a great drawback in that they are very sluggishly reactive even at moderately elevated temperatures. This is particularly exhibited in the case of liquid resin-hardener mixtures comprising low-viscosity and hence low molecular weight epoxide compositions which ordinarily require a relatively long time before being completely hardened. For instance, a reaction mixture comprising 1 epoxy equivalent of 4,4' - dioxy-diphenyl-propane-diglycidyl ether and 0.9 mole of a liquid isomerized product of tetrahydrophthalic anhydride is not hardened after heating for a period of 16 hours at a temperature of 80° C. In fact, it is difficult to see even an initial hardening of the resin mixture. While small amounts of N-glycidyl-alkylamines such as N-diglycidyl-butylamine may be added to accelerate the sluggish hardening reaction, in many instances even the addition of this amine to the reaction mixture does not produce a mixture considered to have a sufficient reactivity.

Recently it has been found that many of the deficiencies and disadvantages encountered when dicarboxylic anhydride type materials are used to harden commonly used epoxide resins can be overcome by utilizing mixtures of N,N' - diglycidyl - N,N' - dialkyl - 1,3 - diamino-2 - hydroxypropane and N-diglycidyl-alkyl-amine [1] as the epoxide starting materials. Not only are the hardening and gel rates of the epoxide reaction mixture improved over what is obtained when a single N-diglycidyl compound is hardened with the same anhydride, but they are superior even to those anhydride hardened resins prepared from diglycidyl compounds of 4,4'-dioxyphenyl-propane. In addition, the lacquer resins produced from the resins of this invention are of high gloss, have a fair resistance to water and chemicals and a good final hardness. The resins produced from these mixtures have good strength properties.

In the preferred process, the above-described advantages, accelerated hardening rates and substantially diminished hardening times are obtained in the reaction of N-glycidyl compounds with dicarboxylic anhydrides by using, as starting materials, epoxide reaction mixtures comprising 10 to 90 weight percent of N,N'-diglycidyl-N,N'-dialkyl - 1,3 - diamino - 2 - hydroxypropanes, and 90 to 10 weight percent N-diglycidyl-alkyl-amine, said mixtures containing at least a hardening quantity of dicarboxylic anhydride.

Further desirable process and product variations include incorporating alkyd resins with optional solvents and additives for preparing lacquer resin compositions useful as air-drying lacquers or stoving lacquers.

---

[1] N-diglycidyl isopropylamine and/or N,N'-diglycidyl-N,N'-diisopropyl-1,3-diamino-2-hydroxypropane are disclosed to increase the viscosity of alkyd resins to be utilized as lacquer resins in S.N. 750,746 filed in the United States Aug. 7, 1968.

In other process alternatives, in some instances it is convenient to subject the epoxide resin compositions to precondensation with one or more suitable reactive compounds such as polyhydric phenols or dicarboxylic anhydrides. An illustration of a typical precondensation reaction comprises condensing from about 0.1 to 0.3 mole of a composition such as dimethylhydantoin with one or both of the epoxide materials. Precondensation reactions such as these, when carried out prior to hardening, many times have a surprising and improved effect on the properties of the epoxide resin compositions and can extend their usefulness for varied applications.

Yet additional process and products include starting materials for the preparation of cast molded materials, e.g., for centrifugal casting products when powdered quartz or other inert fillers are incorporated into the epoxide mixture.

The epoxide resin compositions of this invention may also be utilized as adhesive agents or in the modification of plastomers, duromers and elastomers.

In order to more clearly illustrate the scope of the inventive concept, the following supplemental disclosure is submitted:

(A) Dicarboxylic anhydride type hardeners.—This is a generic term used throughout this disclosure to describe the anhydrides of dibasic acids, their mixtures, derivatives and isomers which are utilized as hardening agents in this invention. These hardeners comprise liquid or semi-solid anhydrides preferably in the liquid state. Illustrative "anhydrides" include isooctenyl succinic anhydride, dodecyl succinic anhydride, the liquid isomerized product of tetrahydrophthalic anhydride or isomerginic acids among others.

(B) Basic nitrogen-containing glycidyl compounds—This is the generic term used throughout this disclosure to describe compounds containing at least one epoxy group

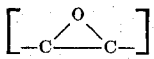

and at least one basic amino group. These are known compounds often available commercially, whose preparation is documented in the scientific and patent literature. Suitable aromatic N-diepoxy compounds which may be hardened in the inventive process include those disclosed in German Pat. 1,132,148 (Frank et al.) wherein free primary aromatic amines are reacted with epichlorohydrin and treating the reaction product with aqueous caustic, preferably at room temperature, using aromatic solvents such as benzene or toluene if desired. Similarly, utilizable nitrogen-containing basic aliphatic diepoxides may be obtained by reacting free primary aliphatic amines with epichlorohydrin and treating the product with aqueous caustic as before. The detailed description of these preparations is disclosed in German Pat. 1,132,146 (Frank et al.). The preparation of other suitable nitrogen-containing glycidyl compounds is disclosed in German Pat. 1,206,915 (Haydn et al.) which describes the preparation of aromatic epoxides by reacting N-alkyl-N-arylamines or aromatic amines with epichlorohydrin in the presence of a solvent that forms azeotropic mixture with water at temperatures below 100° C.

While the above-described nitrogen-containing glycidyl compounds and many others may be satisfactorily hardened, as is many times the case in any large group or class, some members of the class offer advantages over the class as a whole and are therefore favored. In this instance the favored basic nitrogen-containing glycidyl compounds are selected from the group consisting of N,N'-diglycidyl-N,N'-dialkyl-1,3-diamino - 2 - hydroxypropane and N-diglycidyl-alkyl-amine, wherein the alkyl groups may contain 1 to 6 carbon atoms. The compounds preferred for hardening comprise mixtures of N-glycidyl isopropylamine (abbreviated as DIPA) and/or N,N'-diglycidyl N,N'-diisopropyl-1,3-diamino-2-hydroxypropane (abbreviated as DDDH).

The mixture of these two nitrogen-containing glycidyl compounds are preferred because when used together in the presence of dicarboxylic anhydride-type materials they substantially reduce hardening times compared to the hardening times obtained using either basic N-glycidyl compound alone with the same anhydride-type materials.

(C) Optional modifications and additives.—As has been indicated earlier the instant invention lends itself to certain modifications and optional embodiments. For example, it is possible to substantially modify the properties of the epoxide resins being prepared by the inventive concept. A specific embodiment concerns improving the flexibility and lengthening the "pot-life" of the resins by mixing them with polyhydric glycidyl compounds of slower reactivity of the type illustrated by 4,4'-dihydroxy-diphenylpropane (abbreviated as DIAN). Usually, when from 5 to 10 parts by weight of DIAN is incorporated into 95 to 90 parts by weight of the basic nitrogen-containing N-glycidyl compounds the desired prolongation of "pot-life" is obtained. However, much larger proportions of DIAN to the nitrogen-containing glycidyl compounds may be used to obtain resins having properties like DIAN but with improved hardening properties in the resins. For instance, from 5 to 10 parts by weight of the mixture of basic nitrogen-containing glycidyl compounds can be added to 95 to 90 parts by weight of DIAN to produce a substantial increase in the rate of hardening in the predominantly DIAN resin mixture, without substantially compromising the properties of the resin.

Similarly, alkyd resins such as phthalic anhydride-recinene-soy oil-alkyds, 42% by weight soy oil-38% by weight of the phthalic anhydride) can be incorporated into the basic nitrogen-containing glycidyl compound to form a hardened film useful for coating applications when isomerized phthalic anhydride is used as the hardening agents. The alkyd resins which are employed for these modifications are known materials and are prepared by the conventional condensation of polyols with polybasic acids and/or anhydrides described in the technical and patent literature. Inert particulated fillers such as powdered quartz, mica, diatomaceous earth, etc., may also be added to the uncured mixture to obtain resins suitable for cast molding techniques such as centrifugal casting.

(D) Reaction conditions, ratio of reactants, temperature, etc.

(1) Ratio of components.—The quantity of dicarboxylic anhydride-type compound to nitrogen-containing glycidyl is relatively non-critical, as long as at least a hardening amount of anhydride is present. This comprises about 0.5–1.0 mole of "anhydride" per equivalent of epoxide content. This is ordinarily sufficient to produce hardened resins within about an hour at temperatures between 100–130° C. when dodecyl succinic anhydride is utilized as hardener with the preferred epoxide mixture. A narrow ratio of from about 0.8 to 1.0 mole of "anhydride" for each epoxide equivalent of the basic nitrogen-containing glycidyl compound produces hardening at the above temperatures within 30 minutes or less and hence is preferred.

(2) Temperatures.—The temperatures required for hardening are not critical. Ordinarily temperatures ranging from about 50° to 140° C. are satisfactory with temperatures ranging from about 60 to 120° C. being preferred. As indicated earlier, curing times at about 100–120° C. ordinarily are less than an hour, usually from 20 to 30 minutes.

(E) Testing, hardness, flexural strengths, etc.—The measure of hardness obtained in the resins of this invention is that referred to as König's pendulum test, a known procedure described in the literature.[1]

The method of making flexural strength measurements given in the tables of this invention is also a known procedure described in the literature.[2]

In order to illustrate the workings of the inventive process as fully as possible the following illustrative examples are submitted. Unless otherwise stated, all temperatures are in centigrade and all parts and percentages are by weight rather than volume.

Embodiment I—Hardening of a non-nitrogen-containing glycidyl compound-dicarboxylic anhydride of the prior art.

To a conveniently sized reaction vessel equipped with both heating and stirring means is charged a thoroughly mixed admixture of 1 epoxy equivalent of 4,4'-dioxy-diphenyl-propane-diglycidyl ether and 0.9 mole of a liquid isomerized product tetrahydrophthalic anhydride. The mixture is heated to 80° C. and this temperature is maintained for 16 hours. At the end of this time not even an initial hardening of the reaction mixture can be noticed. This is illustrative of the sluggish reactivity of the anhydrides which are the great drawback of the anhydride as hardeners for ordinary epoxies of the prior art.

EXAMPLE 1

Effect on hardening rates of various solvent-free epoxide resin mixtures containing dicarboxylic anhydrides with one or two N-glycidyl compounds Three tests were run, blending 1 gram of the designated epoxide thoroughly with dicarboxylic anhydride. The mixtures of epoxides and anhydrides were tested as to their gel time, and subsequently spread as film of 1 thickness on glass plates which are heated to the designated temperatures. Test 1 utilizes dodecyl succinic anhydride plus DIPA, and the anhydride plus a 50–50 ratio of DIPA and DDDH. Test 2 utilizes mixtures of isooctenyl succinic anhydride plus DIPA and the anhydride plus the 50–50 DIPA-DDDH mixture. Test 3 utilizes a liquid isomerized product of tetrahydrophthalic anhydride with DIPA, and the same anhydride plus the 50–50 DIPA-DDDH mixture. As Table I, which follows indicates, in all instances gel times and hardness values of the mixture of anhydride plus both DIPA and DDDH are substantially improved over those obtained with anhydride plus DIPA alone. It will also be noted that in all instances

[1] Disclosed in DIN 53 157.
[2] Disclosed in DIN 52 362 (January 1955 and November 1961).

hardening times of both DIPA and DIPA-DDDH mixtures are one hour or less at temperatures ranging from 60° C. to 120° C. This rapid hardening time obtained using the inventive concept is a substantial improvement over hardening times obtained when a conventionally employed glycidyl compound such as 4,4'-dioxy-diphenyl propane diglycidyl ether is hardened with a dicarboxylic anhydride as described in Embodiment I.

TABLE I

| Test No. | Dicarboxylic anhydr. (per 0.9 mole) | Epoxide compound (per 1 epoxy equivalent) | Addition | Hardening conditions | Gel time at 100° C. in min. | Hardness measured by König's test with pendulum in sec. |
|---|---|---|---|---|---|---|
| 1 | Dodecyl succinic anhydride | DIPA | | 30 min. at 120° C. | 35 | 6 |
|   |   | Mixture of DIPA/DDDH in 50/50 ratio | | | 17 | 131 |
| 2 | Isooctenyl succinic anhydride | DIPA | | do | 18 | 110 |
|   |   | Mixture of DIPA/DDDH in 50/50 ratio | | | 7.5 | 184 |
| 3 | Liquid isomerized product of tetrahydrophthalic anhydride. | DIPA | | 60 min. at 60° C. | 16 | 19 |
|   |   | Mixture of DIPA/DDDH in 50/50 ratio | | | 4.5 | 117 |

EXAMPLE 2

Hardening of wet films comprising epoxide resin, dicarboxylic anhydride and alkyd resin Using the blending procedure of Example 1, different admixtures of DIPA and DDDH, anhydride and alkyd resin are heated at 80° C. to determine the effect upon hardening time and hardness of the resultant film. Table II shows that process permits the inclusion of alkyd resins without substantially compromising hardening time.

TABLE II

| Mixture [1] | Isomerized product of tetrahydro phthalic anhydride, mole | Phthalic anhydride-ricinene-soy oil-alkyd, g.[2] | Hardening | Hardness measured by König's pendulum test in min. |
|---|---|---|---|---|
| 1.0 epoxide equivalent. | 0.9 | 0.0 | 60 min. at 80° C. | 212 |
|   |   | 125 |   | 184 |
|   |   | 250 |   | 138 |

[1] 50 wt. percent of N-diglycidyl-isopropylamine and 50 wt. percent of N,N'-diglycidyl N,N-diisopropyl-1,3-diamino-2-hydroxypropane.
[2] 42% oil, 38% PAA.

EXAMPLE 3

Flexural strengths of cast molded materials prepared from solvent-free epoxide resin compositions and dicarboxylic anhydrides Three epoxide resin compositions described below are mixed with isomerized product of tetrahydrophthalic anhydride hardener and powdered quartz filler, cast into standard bars and thermoset by heating 16 hours at 80° C. The first composition contains only the equi-weight mixture of the two glycidyl compounds and hardener, the second is precondensed with 0.1 mole of dimethyl hydantoin as indicated. A fourth control batch comprises conventional epoxide composition which has not been precondensed. This batch is also heated for 16 hours at 80° C. As the data of Table III (below) indicates, utilizable quick-hardening epoxide resins having good final properties are produced in all but the conventional epoxide batch (4). This latter did not harden at all within the heating period.

TABLE III

| Epoxide resin composition | Pre-linkage with— | Dicarboxylic anhydride | Filler | Flexural strength in kp./sq. cm. |
|---|---|---|---|---|
| 1 epoxide equivalent mixture of 50 wt. percent N-diglycidyl-isopropylamine with 50 wt. percent N,N'-diglycidyl-N,N'-diisopropyl-1,3-diamino-2-hydroxypropane. | | Isomerized product of tetrahydrophthalic anhydride. | For each respect. mixture 400 wt. percent powdered quartz. | 16 hr. at 80° C., 488. |
| Do | 0.1 mole dian | do | do | 16 hr. at 80° C., 527. |
| Do | 0.1 mole dimethyl hydantoin (60 min. 120° C.). | do | do | 16 hr. at 80° C., 494. |
| Dian-diglycide | | do | do | No hardening. |

As the various embodiments and examples demonstrate, this invention is advantageous in both its process and compositional aspects. For instance, the novel process of this invention substantially increases the rate of hardening obtained when dicarboxylic anhydride type of materials are used as hardening agents for epoxide materials. Further, the novel process permits the hardening to be conducted in the presence of substantial quantities of alkyd resins and/or solvents.

In its compositional aspects, the inventive process is advantageous in that the more rapidly hardened epoxide mixtures have favorable final properties. For example, lacquer resins produced from the inventive nitrogen-containing glycidyl compounds are of high gloss, have a fair resistance to water and good final hardness. In addition, cast molded materials prepared from these plastics have good strength properties.

Finally, the novel invention is relatively flexible insofar as modifications, substitutions and variations that may be made without departing from the inventive concept. For example, various dicarboxylic anhydrides and their derivatives may be utilized as hardening agents with one or more nitrogen-containing glycidyl compounds, and the hardening reaction can be performed in the presence of alkyd resins and/or solvents.

The scope of the inventive concept is best determined by the claims which follow, read in conjunction with this specification.

What is claimed is:

1. Rapidly hardenable epoxide resin compositions suitable for the manufacture of resins including film and cast molding applications, comprising a hardening amount of a dicarboxylic anhydride and a mixture of basic nitrogen-containing glycidyl compound comprising at least one compound selected from the group consisting of N,N'-diglycidyl-N,N'-dialkyl-1,3-diamino-2-hydroxypropanes and at least one basic nitrogen-containing glycidyl compound selected from the group consisting of N-diglycidyl-alkyl-amines, and mixtures therein.

2. The resin composition of claim 1 wherein the alkyl groups contain from 1 to 6 carbon atoms.

3. The resin composition of claim 2 wherein the dicarboxylic anhydride is a liquid at room temperature and the mixture of basic nitrogen-containing glycidyl compound comprises from about 10 to 90% by weight of N,N' - diglycidyl-N,N'-dialkyl-1,3-diamino-2-hydroxypropane and 90 to 10% by weight of N - diglycidyl - alkyl-amine.

4. The resin composition of claim 3 wherein a mixture comprising N,N-diglycidyl-N,N'-diisopropyl-1,3-diamino-2-hydroxy propane and N-diglycidyl isopropylamine is employed as the nitrogen-containing glycidyl compounds.

5. The resin composition of claim 4 wherein the mixture comprises an equi-weight mixture of the two basic nitrogen-containing glycidyl compounds.

6. The resin composition of claim 2 wherein the mixture of basic nitrogen-containing glycidyl compounds-dicarboxylic anhydride includes a 4,4'-dihydroxy-diphenyl-alkane-diglycidyl ether, wherein said alkane of said ether contains from 1 to 6 carbon atoms.

7. The hardened resin composition of claim 1.

8. A process for producing a rapidly hardenable epoxide resin suitable upon hardening for the epoxide resin applications, including film and cast molding applications, comprising admixing a hardening amount of at least one dicarboxylic anhydride with a mixture of basic nitrogen-containing glycidyl compounds comprising at least one compound selected from the group consisting of N,N'-glycidyl - N,N' - dialkyl - 1,3 - diamino - 2 - hydroxypropanes, and at least one compound selected from the group consisting of N-diglycidyl-alkyl amines, and mixtures therein, said alkyl groups containing from 1 to 6 carbon atoms.

9. The process of claim 8 wherein the dicarboxylic anhydride is a liquid at room temperature and the mixture of basic nitrogen-containing glycidyl compound comprises 10 to 90% by weight of N,N'-diglycidyl-N,N'-dialkyl-1,3-diamino-2-hydroxypropanes, and 90 to 10% by weight of N-diglycidyl-alkyl-amines.

10. The process of claim 9 wherein a mixture comprising N,N' - diglycidyl-N,N'-diisopropyl-1,3-diamino-2-hydroxy propane and N-diglycidyl isopropylamine is employed as the basic nitrogen-containing glycidyl compound.

11. The process of claim 10 wherein the mixture comprises an equi-weight mixture of the two basic nitrogen-containing glycidyl compounds.

12. The process of claim 8 wherein the admixture of nitrogen-containing glycidyl compounds are mixed with 4,4'-dihydroxy-diphenyl-alkane diglycidyl ether, wherein said alkane of said ether contains from 1 to 6 carbon atoms.

References Cited
UNITED STATES PATENTS 2,884,406   4/1959   Wegler et al. _____ 260—47
2,921,037   1/1960   Andres et al. _____ 260—47

WILLIAM H. SHORT, Primary Examiner

T. E. PERTILLA, Assistant Examiner

U.S. Cl. X.R.

117—124 E; 161 ZB; 260—2 EA, 22 EA, 37 EP, 47 EP, 47 EA, 78.4 EP